United States Patent
Trinh et al.

(10) Patent No.: US 10,277,641 B2
(45) Date of Patent: *Apr. 30, 2019

(54) PROXIMITY SESSION MOBILITY EXTENSION

(71) Applicant: Mitel Networks Corporation, Mesa, AZ (US)

(72) Inventors: Trung (Tim) Trinh, Nepean (CA); Alain Michaud, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 183 days.

This patent is subject to a terminal disclaimer.

(21) Appl. No.: 15/154,854

(22) Filed: May 13, 2016

(65) Prior Publication Data

US 2016/0261654 A1    Sep. 8, 2016

Related U.S. Application Data

(60) Division of application No. 13/356,125, filed on Jan. 23, 2012, now abandoned, which is a (Continued)

(51) Int. Cl.
*G06F 15/16* (2006.01)
*H04L 29/06* (2006.01)
(Continued)

(52) U.S. Cl.
CPC .......... *H04L 65/4015* (2013.01); *G06F 21/33* (2013.01); *H04L 61/1594* (2013.01); (Continued)

(58) Field of Classification Search
CPC ............. H04L 65/4015; H04L 61/1594; H04L 65/1083; H04L 63/08; H04W 4/21; (Continued)

(56) References Cited

U.S. PATENT DOCUMENTS 7,418,511 B2    8/2008    Takechi
7,693,160 B2    4/2010    Gobara et al.
(Continued)

FOREIGN PATENT DOCUMENTS

EP    1089162 A2    4/2001
EP    1549021 A1    6/2005
(Continued)

*Primary Examiner* — John B Walsh

(57) ABSTRACT

A system and method for seamless exchange and interaction of multimedia content between communication devices are disclosed. The method can include the discovery and identification of devices within proximity of a sending device. The found devices can be authenticated through unique identifiers established during registration. The sender can seamlessly establish a connection with the found devices using the connection requirements. The sending device can share or serve as a remote control to redirect, navigate or draw content, with a simple action or a gesture command, to the found device. The shared multimedia content, can either reside on the sender's mobile device or on a remote server within a connected network. Contextual telephony integration such as pulling in personal contacts from a device to a conference call can be provided. White boarding techniques facilitated among multiple users within a conference and a WiFi® end point or access point are described.

9 Claims, 7 Drawing Sheets

Related U.S. Application Data continuation-in-part of application No. 13/134,396, filed on Jun. 6, 2011.

(51) Int. Cl.

| | | |
|---|---|---|
| *G06F 21/33* | (2013.01) | |
| *H04W 4/02* | (2018.01) | |
| *H04L 29/12* | (2006.01) | |
| *H04W 84/12* | (2009.01) | |
| *H04W 4/21* | (2018.01) | |
| *H04W 12/06* | (2009.01) | |

(52) U.S. Cl.
CPC ......... *H04L 65/1083* (2013.01); *H04W 4/023* (2013.01); *H04W 4/21* (2018.02); *H04W 84/12* (2013.01); *H04L 63/08* (2013.01); *H04W 12/06* (2013.01)

(58) Field of Classification Search
CPC ..... H04W 84/12; H04W 4/023; H04W 12/06; G06F 21/33
See application file for complete search history.

(56) References Cited

U.S. PATENT DOCUMENTS

| | | | |
|---|---|---|---|
| 7,774,505 B2 | 8/2010 | Kang | |
| 7,895,338 B2 | 2/2011 | Leaute et al. | |
| 7,925,763 B2 | 4/2011 | Cai | |
| 8,085,759 B2 | 12/2011 | Neuhaus | |
| 8,121,057 B1 * | 2/2012 | Botha | H04L 12/1827 370/270 |
| 8,243,702 B2 | 8/2012 | Maruyama | |
| 8,248,967 B2 | 8/2012 | Nagy et al. | |
| 2002/0021307 A1 | 2/2002 | Glenn | |
| 2002/0040397 A1 | 4/2002 | Choi | |
| 2002/0099827 A1 | 7/2002 | Shah et al. | |
| 2002/0147791 A1 | 10/2002 | Choi | |
| 2003/0093459 A1 | 5/2003 | Dowling | |
| 2003/0172184 A1 | 9/2003 | Kong | |
| 2004/0141472 A1 | 7/2004 | Haddad | |
| 2004/0205245 A1 | 10/2004 | Le Pennec | |
| 2004/0260761 A1 | 12/2004 | Leaute | |
| 2005/0022171 A1 | 1/2005 | Langkafel et al. | |
| 2005/0091380 A1 | 4/2005 | Gonen | |
| 2005/0108320 A1 | 5/2005 | Lord et al. | |
| 2005/0132003 A1 | 6/2005 | Philyaw | |
| 2005/0262254 A1 | 11/2005 | Sherwani | |
| 2006/0031559 A1 | 2/2006 | Sorokopud et al. | |
| 2006/0239190 A1 | 10/2006 | Kumar | |
| 2006/0293028 A1 | 12/2006 | Gadamsetty | |
| 2007/0027367 A1 | 2/2007 | Oliver | |
| 2007/0168447 A1 * | 7/2007 | Chen | G06Q 10/107 709/207 |
| 2007/0219817 A1 | 9/2007 | Wu | |
| 2007/0286100 A1 | 12/2007 | Saaranen et al. | |
| 2007/0288754 A1 | 12/2007 | Kaji | |
| 2008/0112354 A1 | 5/2008 | Toutonghi | |
| 2008/0165765 A1 | 7/2008 | Neuhaus | |
| 2009/0007244 A1 * | 1/2009 | Monahan | H04L 9/32 726/5 |
| 2009/0124284 A1 | 5/2009 | Scherzer | |
| 2009/0254839 A1 | 10/2009 | Kripalani et al. | |
| 2009/0327247 A1 * | 12/2009 | Jia | H04L 51/04 |
| 2010/0015976 A1 * | 1/2010 | Issa | G06F 17/30699 455/435.1 |
| 2010/0027777 A1 * | 2/2010 | Gupta | H04M 3/42195 379/210.01 |
| 2010/0069068 A1 | 3/2010 | Clark | |
| 2010/0081419 A1 | 4/2010 | Chiaug et al. | |
| 2010/0094996 A1 | 4/2010 | Samaha | |
| 2010/0128701 A1 | 5/2010 | Nagaraja | |
| 2010/0177671 A1 | 7/2010 | Qiu et al. | |
| 2010/0228978 A1 | 9/2010 | Kudo | |
| 2010/0269159 A1 | 10/2010 | Oertel | |
| 2010/0274859 A1 | 10/2010 | Bucuk | |
| 2010/0293289 A1 | 11/2010 | Hsu et al. | |
| 2010/0312903 A1 | 12/2010 | Miyata | |
| 2011/0039584 A1 | 2/2011 | Merrett | |
| 2011/0087775 A1 | 4/2011 | Lee et al. | |
| 2011/0200006 A1 | 8/2011 | Kwon et al. | |
| 2011/0268418 A1 | 11/2011 | Jones et al. | |
| 2011/0270922 A1 | 11/2011 | Jones et al. | |
| 2011/0276669 A1 | 11/2011 | Wei et al. | |
| 2012/0079086 A1 | 3/2012 | Miettinen | |
| 2012/0092438 A1 * | 4/2012 | Guzman Suarez | H04N 7/15 348/14.03 |
| 2012/0117250 A1 | 5/2012 | Santamaria et al. | |
| 2012/0163235 A1 | 6/2012 | Ho et al. | |
| 2012/0209930 A1 | 8/2012 | Plumb | |
| 2012/0243469 A1 | 9/2012 | Klein | |
| 2012/0306622 A1 | 12/2012 | Trinh et al. | |
| 2013/0007231 A1 | 1/2013 | Forssell | |
| 2013/0346553 A1 | 12/2013 | Shin et al. | |

FOREIGN PATENT DOCUMENTS

| | | |
|---|---|---|
| EP | 1635574 A2 | 3/2006 |
| EP | 1708528 A1 | 10/2006 |
| WO | WO 2005/114967 A2 | 12/2005 |
| WO | WO 2010/010637 A1 | 1/2010 |

\* cited by examiner

PROXIMITY SESSION MOBILITY EXTENSION

REFERENCE TO RELATED APPLICATIONS

This disclosure is a divisional of U.S. patent application Ser. No. 13/356,125 titled PROXIMITY SESSION MOBILITY EXTENSION to Trung (Tim) Trinh and Alain Michaud that was filed Jan. 23, 2012, which is a continuation-in-part of U.S. patent application Ser. No. 13/134,396 titled PROXIMITY SESSION MOBILITY to Trung (Tim) Trinh and Alain Michaud that was filed on Jun. 6, 2011.

TECHNICAL FIELD

This disclosure generally relates to communications, and more particularly, to an extended system and method for seamlessly exchanging and interacting with multimedia content between devices in proximity on a network.

BACKGROUND

The proliferation of smart phones and the rising popularity of tablet-like devices, with their rich multimedia capabilities, have created demands for seamless collaboration between these devices in personal and enterprise networks. Gradually, these devices have been introduced into the workplace creating a diversified mobile client working environment. Seamless collaboration between these devices becomes more difficult especially with the variety of available devices coupled with the differences in operating systems, versions, vendors, and models.

Due to technology limitations and form factor of touch screen mobile and tablet devices, innovative approaches have been employed to minimize the typing required for interactions between the users and the devices. For example, the use of gesturing, speech recognition and drag and drop capabilities, instead of typing in the required information, have become a trend. Being able to collaborate and share information without the need to type in information, such as a destination address, URL or authentication credentials, becomes a necessity rather than a desire for touch screen or small form-factor mobile devices.

Information can be shared and exchanged through different methods such as File Transfer Protocol (FTP), Hypertext Transfer Protocol (HTTP or HTTPs) (web session), Virtual Private Network (VPN), Remote Desktop Protocol (RDP), etc. These methods require manual authentication or credentials to be exchanged as part of the collaborative session initiation. Such requirement makes it impractical for the touch-screen devices that are dominantly relied on by drag-and-drop or gesture-based interactions.

Often, participants brought into a conference call on the spot are not briefed of the context of their participation such as the meeting topic or the reason why that participant's presence is required. Guest users also need to have a temporary identification issued or go through a manual device registration process before gaining access to enterprise WiFi® connectivity unless the enterprise has an open WiFi® connectivity without security restriction.

As a further restriction on current systems, mobile users who wish to transfer data from their mobile device to a local machine or device at a visiting enterprise, have to download data which includes transferring data from their enterprise to the mobile device then transfer the data back to the visiting enterprise. This incurs mobile data transfer costs using standard 3G/4G networks. The participant also needs to request WiFi® access subject to the approval from the proper department at the visiting enterprise. Once approval is given, the participant can enter in a service set identifier (SSID), access token and select the proper encryption option, the process being tedious and not guaranteeing instant access.

In conferences, the participant often uses an available whiteboard in the room. A number of issues arise, however. People in the conference call will not be capable of seeing what is being drawn nor can they fully participate. These outside participants are not able to interact and provide their own input. Furthermore, the content is not easily captured for the future and cannot be referenced for follow ups.

Therefore, an extension to a proximity session mobility system and method is needed that facilitates the seamless exchange of media content and interaction between different devices within a network. These, as well as other related advantages, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

Figure 1:
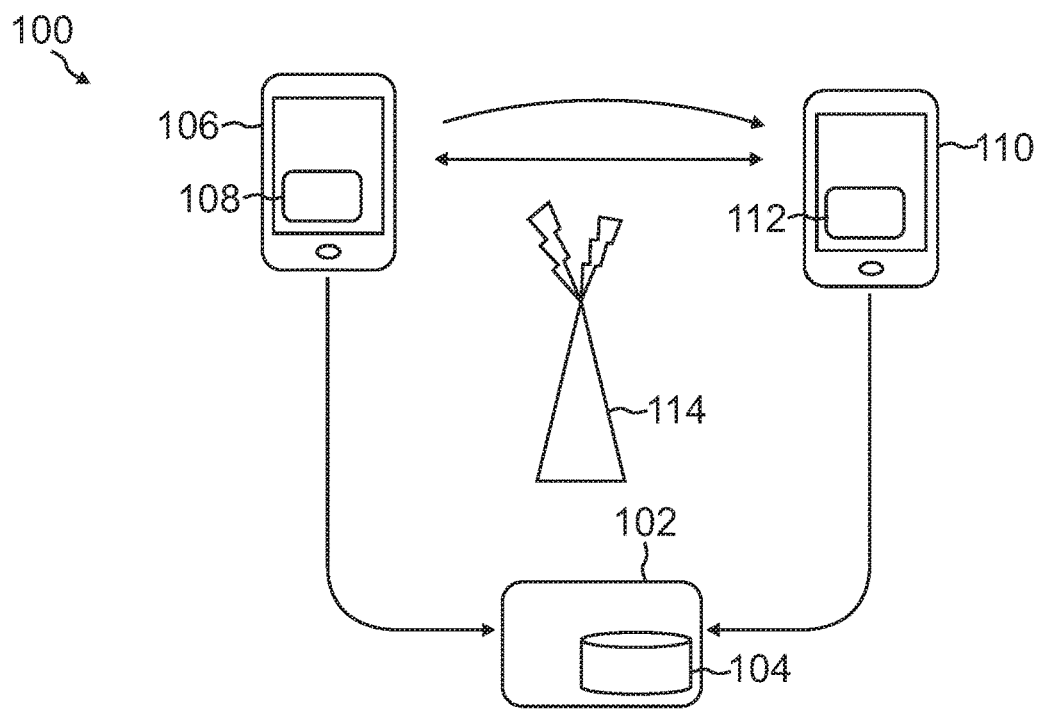
FIG. 1 is an exemplary system for sharing information between devices within proximity in accordance with one or more aspects of the present disclosure.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the present disclosure relates to communications. More specifically, this disclosure relates to proximity session mobility. In one illustrative embodiment, a system and method for seamless exchange and interaction of multimedia content between communication devices in a network are disclosed. The method can include the discovery and identification of devices within proximity of a sending device. The found devices can be authenticated through unique identifiers established during registration. Connection requirements can be determined based on the identifiers associated with the found devices and the sending device. In turn, the sender can establish a connection with the found devices using the connection requirements. The exchanged content can be, but is not limited to, multimedia based information, applications, contacts, virtual desktop sessions, remote desktop sessions or virtual mobile sessions. The sending device can share or serve as a remote control to redirect and navigate the content, with a simple action or a gesture command, to the found device. The shared multimedia content, can either reside on the sender's mobile device or on a remote server within a connected network. The multimedia sharing supports one-to-one and one-to-many topologies.

As an extension to the system and method, telephony applications can be tied in with session mobility. For example, whiteboards on each of the devices can be integrated seamlessly. The mobile phone can also act as a remote control to bring contacts into the conference call thereby leveraging the mobile phone's native interface without the need to know the destination number of the conference device. Participants being brought into the conference can be provided with the proper context of the current interaction/presentation. Context information can be shown visually or presented audibly. In addition, the conferencing appliance can turn into a temporary WiFi® access point or end point for conveniently connecting the user's mobile device to a corporate network in a restricted and secured way.

Numerous advantages can be offered by the illustrative embodiment described above. Logging into a remote device before sharing or sending information has been removed as well as credential exchanges required prior to collaboration. In addition, the device can be used as a remote control to redirect the session and to navigate the interaction within a new destined session. The proximity sessions mobility is not restricted to just sharing of multimedia but potentially can be used to instantly transfer information from one small and low end device to a larger and higher display quality device for appeal and visual effect enhancements. Bidirectional collaborative interaction can be achieved with devices that have different makes and models within a connected network. The remote device along with white boarding capabilities can be used for enhancing conference capabilities. Many additional advantages of the present disclosure will become apparent to those skilled in the relevant art as provided for in the following description.

Figure 2:
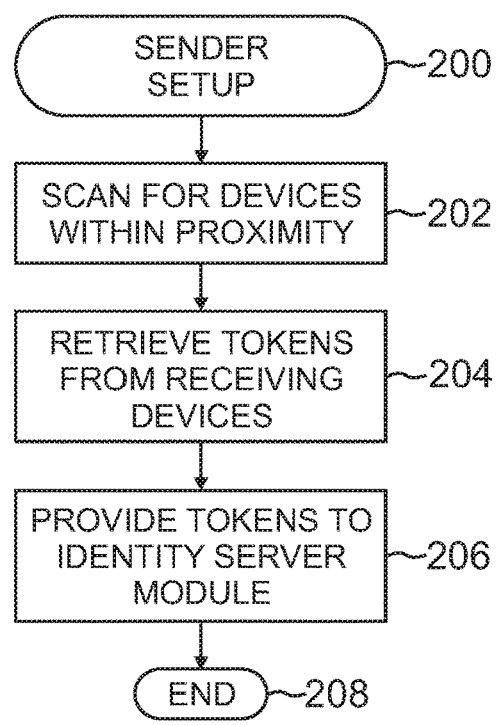
FIG. 2 is a flow chart depicting illustrative procedures for setting up devices in accordance with one or more aspects of the present disclosure.
Figure 3:
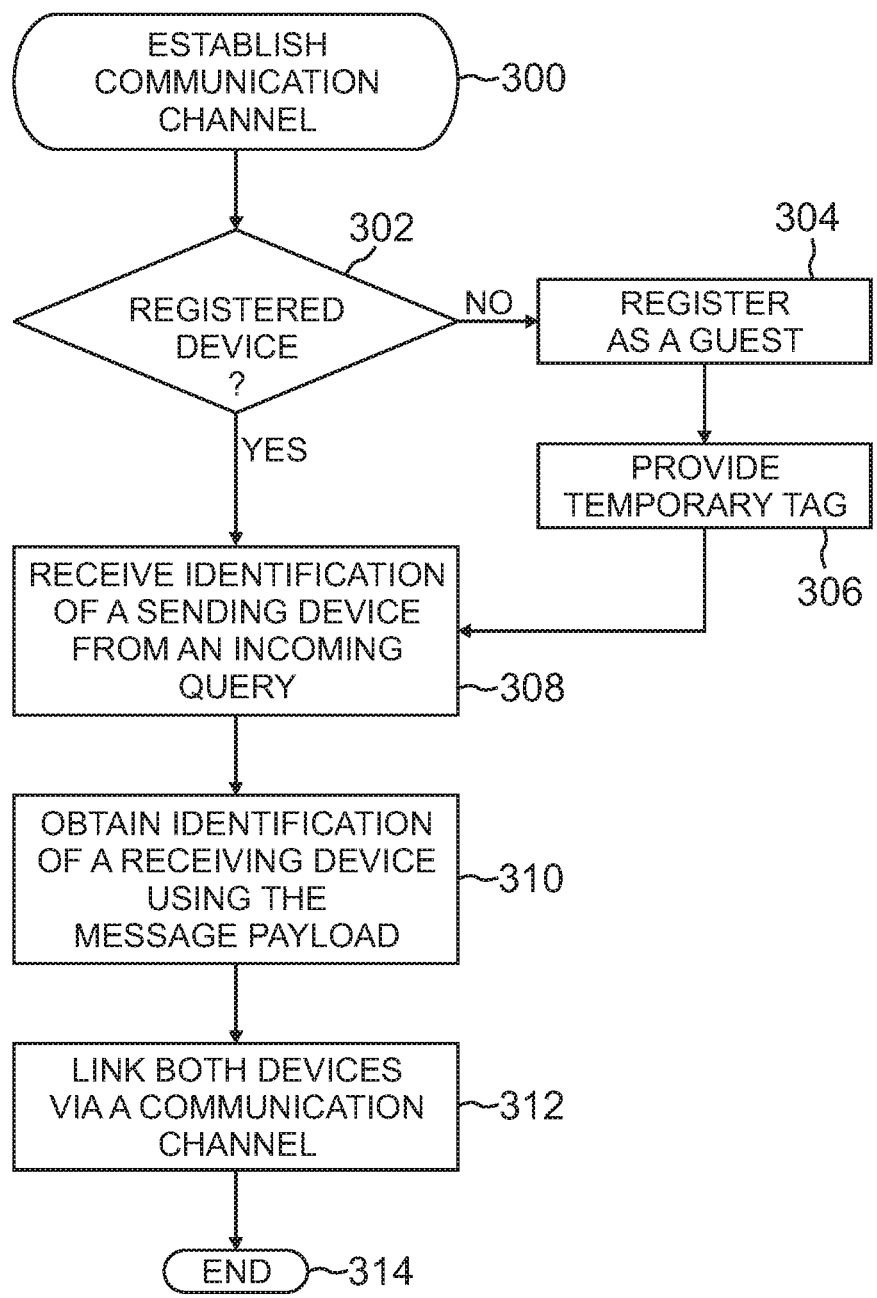
FIG. 3 is a flow chart depicting illustrative procedures for establishing a communication channel between devices in accordance with one or more aspects of the present disclosure.
Figure 4:
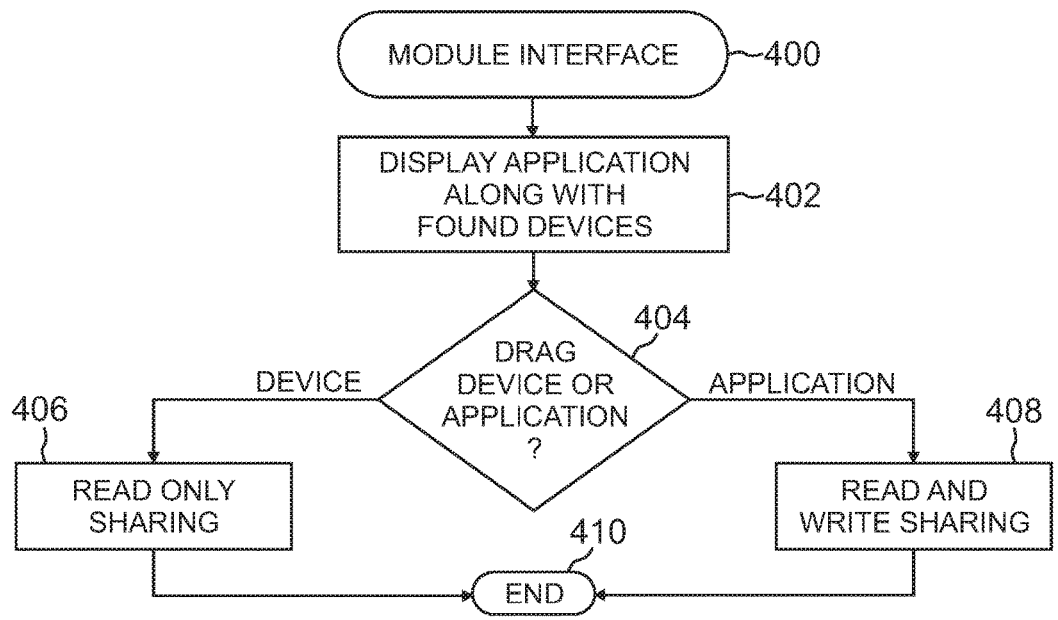
FIG. 4 is a flow chart depicting illustrative procedures for sharing information on a user interface provided by an exchange agent module in accordance with one or more aspects of the present disclosure.
Figure 8:
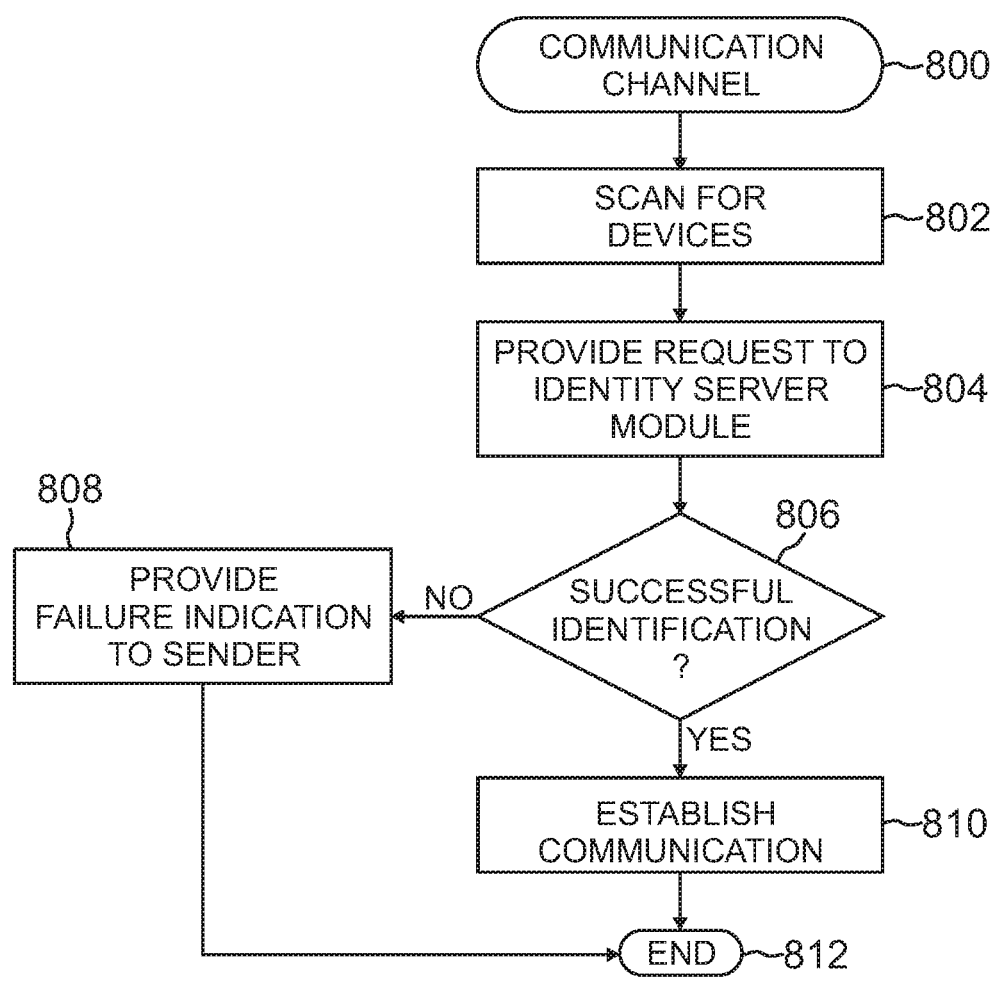
FIG. 8 is a flow chart depicting illustrative procedures for setting up the communication channel using reverse lookup in accordance with one or more aspects of the present disclosure.
Figure 9:
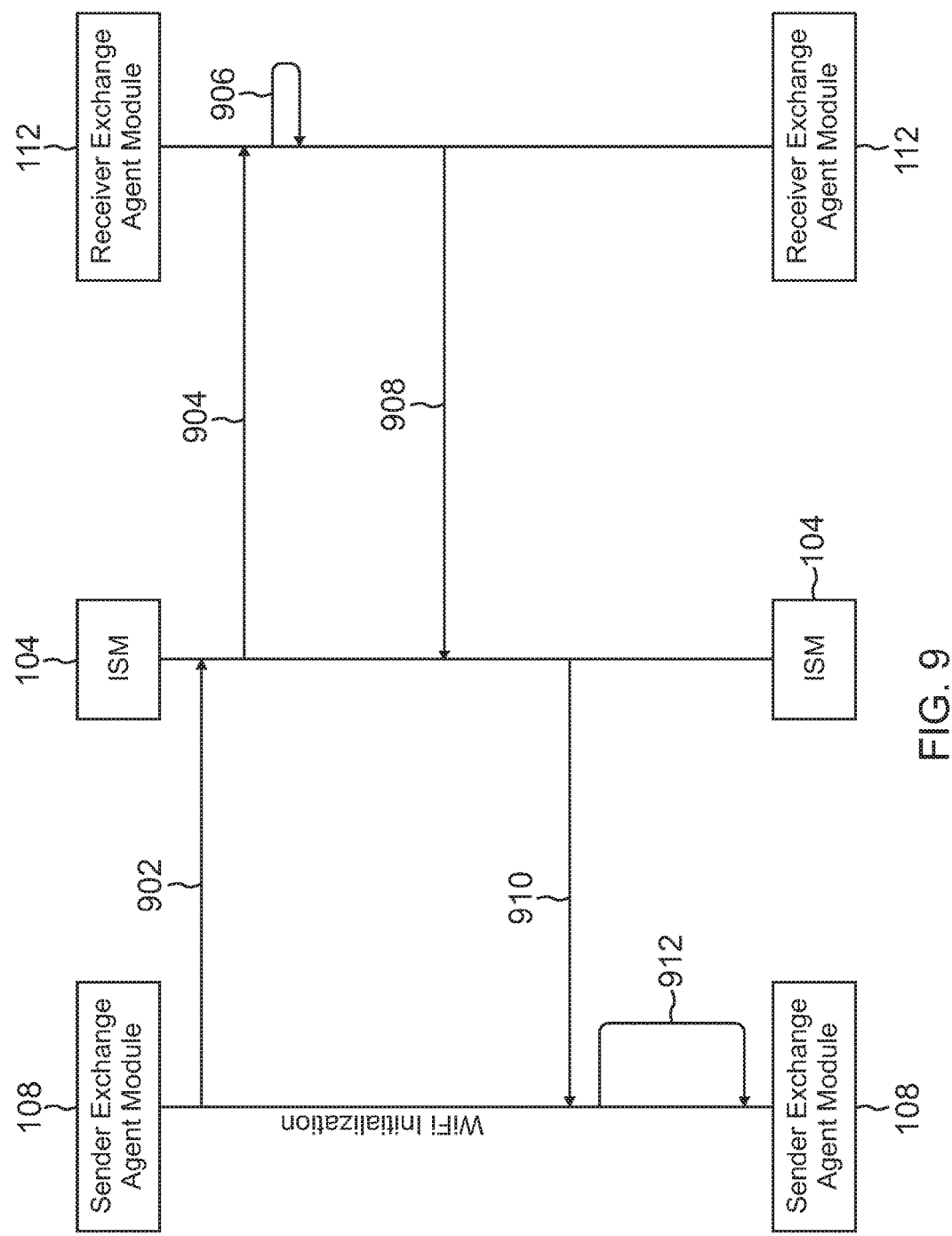
FIG. 9 is a sequence diagram depicting illustrative procedures for seamlessly enabling WiFi® communications between a stationary multimedia phone device and a mobile phone in accordance with one or more aspects of the present disclosure.
Figure 10:
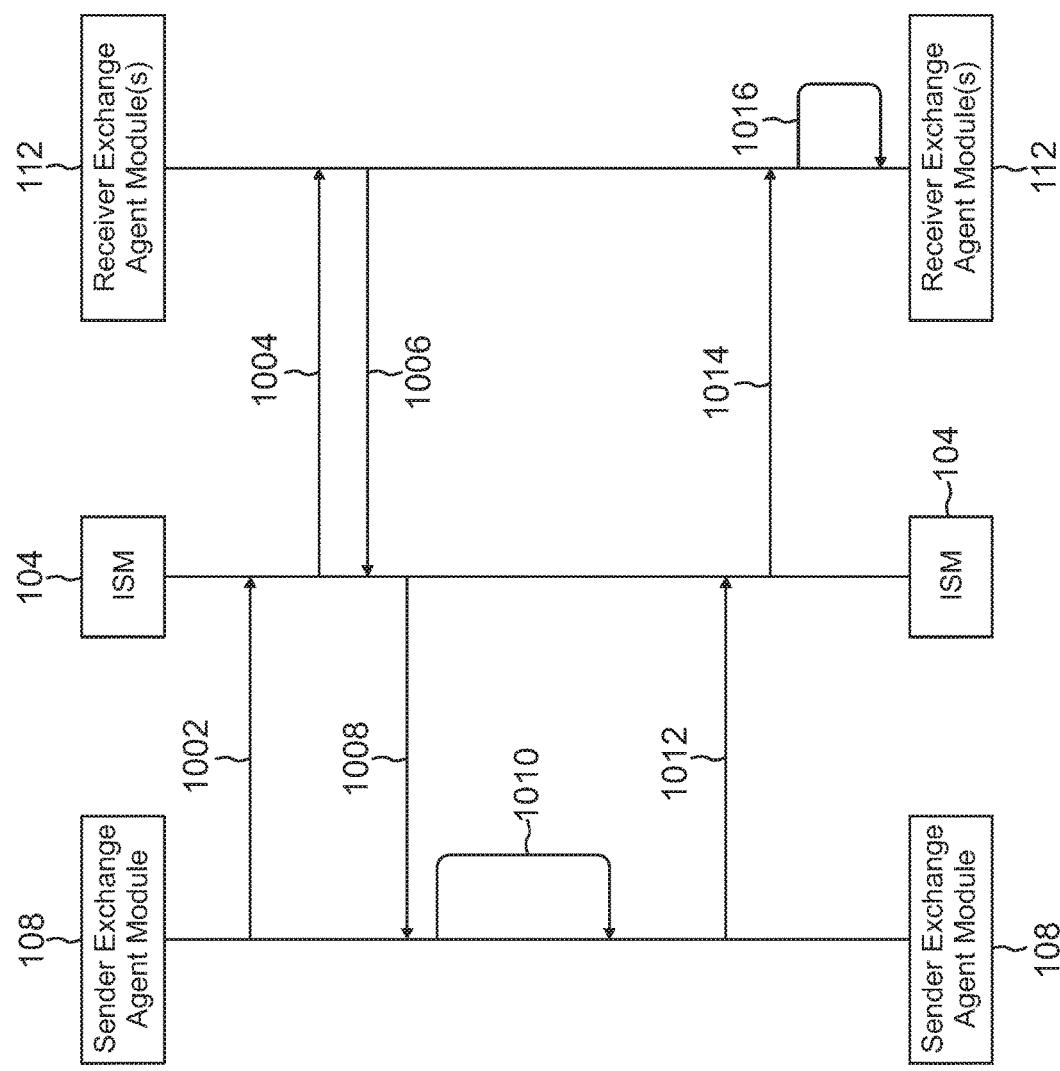
FIG. 10 is a sequence diagram depicting illustrative procedures for sharing information from a mobile device to participants in a conference call in accordance with one or more aspects of the present disclosure.

Exemplary systems for exchanging content will be described in FIGS. 1, 5 and 7. FIGS. 2 through 4 will provide exemplary procedures for establishing a communication channel between devices. FIG. 6 discloses procedures for establishing a streaming session between devices while FIG. 8 provides procedures for a reverse lookup for proper identification of a receiver. FIG. 9 discloses procedures for seamlessly enabling a WiFi® communication between devices and FIG. 10 provides procedures for white boarding from a mobile device to share information to the participants on the call. In this disclosure, devices can be referred to as communication devices that can be mobile or not. These devices can include tablets, mobile phones, smartphones, personal digital assistants, handheld computers, standalone computers, conference devices or the like. The communication devices can also be referred to as sending devices and receiving or found devices.

Turning now to FIG. 1, an exemplary system 100 for sharing information between communication devices 106 and 110 within proximity in accordance with one or more aspects of the present disclosure is provided. The system 100 can include an identity server module 104 operating on a server 102 that can be wirelessly connected to a plurality of communication devices 106 and 110 having exchange agent modules 108 and 112. Communications between them can be facilitated through a wireless interface 114 distributed within proximity of the devices 106 and 110. Fewer or more components can be represented within the system 100 and are not limited to those shown. For example, while two devices 106 and 110 have been provided, many more can be shown each interconnected with one another through communication channels defined by the identity server module 104.

Proximity session mobility can be applied to any devices 106 and 110. It is desirable or often necessary for applications to share data between these services. The modules 108 and 112, or at least components thereof, can be used as add-ons to existing applications or devices 106 and 110. For example, the exchange agent modules 108 and 112 running thereon can be downloaded onto existing mobile phones and or added to conference phones. The wireless interface 114, in association with the identity server module 104 on the server 102, can connect components within the system 100. Communications between the devices 106 and 110 and to the server 102 can be facilitated through the interface 114. The interface 114 can connect with the server 102 wirelessly or through a wireline connection.

Continuing with FIG. 1, the identity server module 104 can operate on a traditional server 102. The server 102 can include an operating system and software instructions, memory, at least one processor and a network interface. The server can process requests and typically handle high volumes of transactions and large amount of queries for communication and data processing. The identity server module 104 can provide information such as a device's name, number, Internet Protocol (IP) address and potentially, location. The module 104 can also provide a mechanism by which the devices 106 and 110 can establish a communication channel. The location of the devices 106 and 110 can be determined by observing one device paired with a static device such as a conference phone. The location information can be used to enhance the session experience by leveraging what the area has to offer, for example, local printers. This information can be used to populate presence information.

The exchange agent modules 108 and 112 on the communication devices 106 and 110 can be responsible for identifying devices in proximity and managing the sharing protocol. Operationally, each of the devices 106 and 110 can maintain a wireless interface for communication with one another and the identity server module 104 on the server 102. Referring to FIG. 2, a flow chart depicting illustrative procedures for setting up these devices 106 and 110 in accordance with one or more aspects of the present disclosure is provided. The procedures can begin at block 200. The exchange agent modules 108 and 112 can be downloaded or pre-installed on each of the devices 106 and 110. The communication devices 106 and 110 can register with the identity server module 104 which assigns the device a unique device address or identifier. These identifiers can be referred to as tokens with usages for these tokens becoming apparent from the disclosure provided below. The devices 106 and 110 can be registered with the module 104 using a number of different techniques.

Once activated, the exchange agent module 108 on the sending device 106 can scan for devices 110 at block 202. The exchange agent module 108 on the sending device 106 can scan for nearby devices to identify available receiving devices 110 within proximity. Numerous types of scanning techniques can be used by the sending device 106. The scanning techniques can include near field communications (NFC), Bluetooth™, graphical tag recognition, facial recognition and global positioning system (GPS) signaling or wireless networks, depending on the options and the state (on/off) of protocols available on the receiving devices 110. A combination of these techniques can be implemented and used by the sending device 106.

Information about receiving devices 110 can be reported back to the sending device 106. These found devices 110 can be displayed on a graphical display of the sending device 106 along with any other information about the receiving devices 110 in proximity with proper user identity which is stored in the identity server 102. For example, the sending device 106 can locate a number of different devices in proximity, but only those that have registered with the identity server module 104 are shown on the display of the sending device 106. After scanning is completed, the exchange agent module 108 on the sending device 106 now has a unique token for found devices 110. At block 204, these tokens are retrieved. These unique tokens as described earlier can be the information that was provided by the identity server module 104 when the devices 110 were registered. These tokens can then be sent to the identity server module 104 at block 206. The identity server module 104 can pull up information or communicate with all devices 106 and 110 given that the identifiers for them are known. The procedures can end at block 208.

In one embodiment, the identity server module 104 can send or push updates to known devices 106 and 110 so that they can communicate with each other. This can include auto pairing the Bluetooth™ radios on the devices 106 and 110 using the identity server module 104 as a mediator. Uniform resource links or IP addresses for the communication devices 106 and 110 can be sent to another device.

When the receiving device 110 has been located, communication between the sending device 106 and the receiving device 110 can be established and more specifically, the exchange agent modules 108 and 112 therein. FIG. 3 is a flow chart depicting illustrative procedures for establishing a communication channel between the devices 106 and 110 in accordance with one or more aspects of the present disclosure. The procedures can begin at block 300. The exchange agent module 108 on the sending device 106 can use the previously identified information to validate the receiving device 110 with the identity server module 104 and collect more information for connection requirements.

At decision block 302, the sending device 106 can determine whether the receiving device 110 within the previous scan was registered properly. The receiving device 110 should have been registered, as guest or known account, with the identity server module 104 on the server 102 prior to communicating with the sending device 106. Within a connected network, it is assumed that all the communication devices 106 and 110 are already authenticated, and each device is dynamically assigned a unique identifier, i.e. an IP address, Media Access Control (MAC) address, electronic mail address or phone number so that they can be discovered by other devices.

When the receiving device 110 has not been registered, the device 110 can be prompted to register as a guest when the device enters into the system 100 or detected by the wireless interface 114 at block 304. The identity server module 104 can also provide a temporary tag which acts as an identifier for the device 110 at block 306. In one embodiment, the assigned tag can be used by other devices, for example, via a camera scanning method. The tag can contain an address or a Uniform Resource Identifier (URI) referencing the other device. It can also be used to derive the address or URI via a reverse lookup. The temporary guest account can also be established for the sending device 106 and can be setup through similar methods.

At block 308, the identity server module 104 can receive identification of a sending device 106 from an incoming query. The identity server module 104 can know the identification of both parties through the query. The first identification can be obtained from the incoming query which contains the identification such as the token, IP address, MAC address etc. of the sending device 106. The identification of the receiving device 110 can be obtained from the message payload which contains the identifier for the receiving device 110 at block 310. With both identifications known, the identity server module 104 can initiate a background operation to link both devices via a communication channel at block 312. The exchange agent module 108 on the sending device can then establish the sharing connection with the exchange agent module 112 on the receiving device 110. The procedures can end at block 314.

The channel established between the sending device 106 and the receiving device 110 can either be peer-to-peer or client-server based. In one embodiment, the communication channel between the devices 106 and 110 is accomplished via a Transmission Control Protocol (TCP)/User Datagram Protocol (UDP) connection or Short Message Service (SMS) messaging. The connection can be terminated either by the sending device 106 or by a proximity detection mechanism or remotely via an administrative interface on the server 102 having the identity server module 104. In one embodiment, activity on the sending device 106 can be monitored by the receiving device 110 or identity server module 104 such that after a period of inactivity the session can be closed. Alternatively, the sending device 106 can disconnect itself after the period of inactivity.

Content can be provided or shared between the sending device 106 and receiving device 110. FIG. 4 is a flow chart depicting illustrative procedures for sharing information on a user interface provided by an exchange agent module 108 in accordance with one or more aspects of the present disclosure. The procedures can begin at block 400. With a connection established, a graphical display can show depictions of the identified or receiving device 110 so that a user of the sending device 106 can either drag the application or media to be shared to the receiving devices 110 or drag the receiving devices 110 to the application or media to be shared at block 402. Instructions can be provided on the display of the sending device 106.

At decision block 404, the sending device 106 can determine whether the user has dragged the device 110 to the application or the application to the device 110. The display can provide graphical representations of both. At block 406, when the receiving device 110 is dragged to the application, the sending device 106 provides read only content to the receiving device 110. When the application is dragged to the receiving device 110, at block 408, the sending device 106 provides content which can be presented as read and write enabled to the receiving device 110. Other techniques can be implemented for content sharing. For example, a menu or button click can replace the dragging technique. The procedures can end at block 410.

When receiving static content, the receiving devices 110 can view and discard the provided information from the sending device 106. In one embodiment, the receiving devices 110 can save the content if the sending device 106 allows it prior to starting the shared session. For dynamic content, the receiving device 110 can edit, discard or push back the content to the sender or vice versa.

The proximity session mobility feature can be disabled remotely from the server 102 having the identity server module 104 in case of a lost or stolen device. The exchange agent modules 108 and 112 on the communication devices 106 and 110, or at least a portion thereof, can be implemented as a background service. The background service can wait for input from either the identity server module 104 or associated/paired devices. This can allow the exchange agent modules 108 and 112 to be passive and do much if not all of the work with minimal user interaction.

To illustrate proximity session mobility, an exemplary receiving device 110, in the form of a conference phone, and a sending device 106, in the form of a mobile phone, is presented. When the mobile phone 106 equipped with an exchange agent module 108 is pointed at the conference phone 110, also having an exchange agent module 112, the conference phone 110 can display a graphical representation of the mobile phone 106 in proximity as an identified device that can be shared. The user can push a button on the conference phone 110 to confirm and their virtual remote desktop can show up on the conference phone 110. The user of the mobile phone 106 can either use the conference phone keyboard to navigate the multimedia session or use the exchange agent module 108 to control the navigation. To terminate the sharing session, the mobile phone user can either initiate a disconnect action from the exchange agent module 108 on the mobile phone 106, or just allow out-of-range proximity detection to be activated by walking away from the conference room with the device.

Once session mobility can be established between a sending device 106 and a receiving device 110, in the form of a conference appliance, not only can the user of the sending device 106 control the presentation on the receiving device 110, but they can also initiate a request to bring in their own contacts. For example, the sending device 106, from their mobile device's native interface or from a cloud network access application such as Google Mail®/contact feed, can import in data or contacts that can be connected into the conference call without actually making a phone call from the sending device 106 to a new user. Furthermore, the sending device 106 typically does not need to know the conference call number.

The newly invited user can receive the call alert. In addition, the user can receive the context in which the conference call takes place. For example, caller information (i.e. the name of mobile device owner instead of the caller id of the conference device), meeting participants, meeting topic/subject and the current discussion point such as a snap shot of the current presentation, can be provided to the newly invited party. Participant information can be presented in a number of forms. This information can be pulled off a centralized server and provided to the user.

Telephony applications can be tied in with session mobility by using the mobile phone 106 as a remote control to bring contacts to the conference call leveraging the mobile phone's native interface without the need to know the destination number of the conference device 110. Participants being brought into the conference can be provided with a proper context of the current interaction/presentation. Context information can be shown visually or presented audibly. The mobile user should be able to bring in more participants to the conference using their native mobile phone contacts without requiring the mobile telephony channel since the mobile phone 106 is acting as a remote control.

The identity server module 104 can prevent some devices 106 from acting like remote controls and instead limit the scope of these devices, for example, a device can be delegated to a speaker such that those participants further away from the receiving device 110 would be able to hear the conversation for the conference. The device can be prevented from enacting white boarding techniques. Other designations can be used to distinguish devices 106 connected with the receiving device 110 to limit their interactions with it.

After the mobile user starts dialing a contact, the exchange agent module 108 on the sending device 106 can intercept the dialing process and collect the contact information for that number. The contact can be automatically added into the conference, after being authorized by the user of the device 106. In one embodiment, after selecting a contact from their native contact application, the user can have the option to add a chosen contact directly into the conference without dialing their number, since the exchange agent module 108 on the sending device 106 can extend the native contact application. The user can choose a contact from an aggregate list displayed in the user interface of the exchange agent module 108. This aggregate list can be a combination of local mobile device contacts, cloud-based contacts and enterprise contacts. This information can then be proxied to the receiving device 110 via the identity server module 104. The receiving device 110 can then request a proxy dialing via consultation call. The exchange agent module 112 on the receiving device 110 can have the necessary information about the current call, participants, context, etc. that can be passed to the newly invited contact via a data channel or text-to-speech (TTS) audio.

Figure 5:
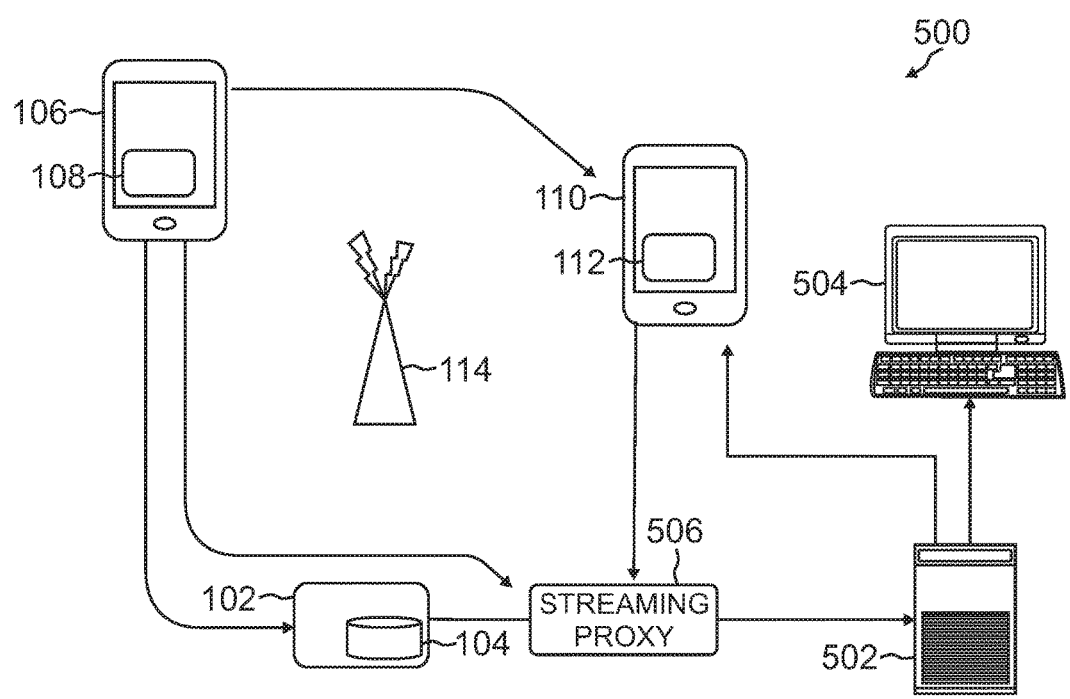
FIG. 5 is an exemplary system for providing a multimedia session through a streaming server in accordance with one or more aspects of the present disclosure.
Figure 6:
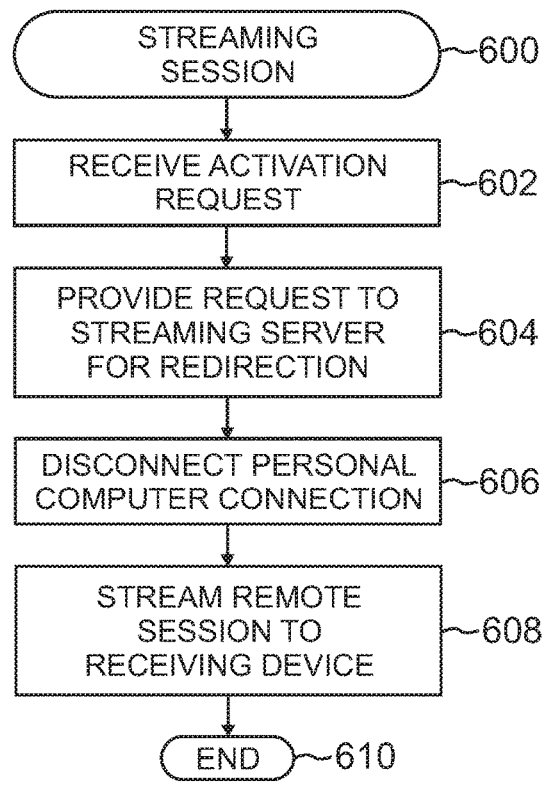
FIG. 6 is a flow chart depicting illustrative procedures for providing a streaming session in accordance with one or more aspects of the present disclosure.

Turning to FIG. 5, an exemplary system 500 for providing a multimedia session through a streaming server 502 in accordance with one or more aspects of the present disclosure is provided. The system 500 can include an identity server module 104 operating on a server 102 that can be wirelessly connected to a plurality of communication devices 106 and 110 having exchange agent modules 108 and 112. Communications between them can be facilitated through a wireless interface 114 distributed within proximity of the devices 106 and 110. For the case of using a mobile device as a remote control to redirect and navigate a remote session, the system 500 is the same as above with the addition of the streaming server 502 and streaming proxy 506. Fewer or more components can be represented within the system 100 and are not limited to those shown.

Through the addition of the streaming server 502 and streaming proxy 506, the previous system 100 can be altered for other applications such as video streaming redirection using the sending device 106 as a remote control. For example, the user of the sending device 106 can simply beam itself through its exchange agent module 108 to a receiving device 110, which can be in the form of a video conferencing unit. The conferencing unit 110 can be connected to a monitor or projector that displays the sending device's desktop session for presentation to the rest of the participants. The streaming server 502 can operate on a traditional server. The server can include an operating system and software instructions, memory, at least one processor and a network interface. The server can process requests and typically handle high volumes of transactions and large amount of queries for communication and data processing.

The streaming server 502 can be managed through the streaming proxy 506. The streaming proxy 506 described herein can be implemented as logical operations and/or modules attached to the server 502 or can be implemented on a separate physical component itself. Through the system 500, the sending device 106 can be the user's link to their workspace or session. As the user moves, they retain the ability to project, forward and recall their session to and from other receiving devices 110.

A multimedia session can be a remote desktop session such as VMware View™. The streaming server 502 can be responsible for serving the multimedia data to a remote location. In operation, the streaming server 502 can use a Remote Desktop Protocol (RDP), Personal Computer over Internet Protocol (PCoIP), Virtual Network Computing (VNC), etc. The streaming proxy 506 can be responsible for redirecting and multicasting the traffic to a newer location identified by the exchange agent module 108.

The redirection technique employs two alternatives. In one embodiment, the streaming proxy 506 can instruct the streaming server 502 to stop the current streaming and start a new one to a new end point destination address. Alternatively, the streaming proxy 506 can redirect the extension data between the streaming server 502 and the new end point devices. Once the remote session is displayed at the receiving device 110, the sending device 106 can either let the receiving device 110 navigate the session or alternatively the sending device 106 can control the navigation via its exchange agent module 108. When there are multiple receiving devices 110, only the sending device 106 can navigate the content unless the control is passed to another receiving device 110.

Referring to FIG. 6, a flow chart depicting illustrative procedures for providing a streaming session in accordance with one or more aspects of the present disclosure is provided. The procedures can begin at block 600. The procedures described herein can be interchanged and are not limited to the disclosed embodiment. Initially, the streaming server 502 can be serving content to the remote desktop session on the PC 504 as depicted in FIG. 5.

To control the streaming session, the receiving device 110 can register with the identity server module 104, which assigns the device 110 to a unique address. The exchange agent module 108 on the sending device 106 can scan for nearby devices to identify available receiving devices 110 within proximity. The exchange agent module 108 on the sending device 106 can use the identified information to validate with the identity server module 104 operating on the server 102. The identity server module 104 can collect more information for the reconnection requirements.

In turn, a sender operating the sending device 106 can press a share button which activates the request to the streaming proxy 506. At block 602, the streaming proxy 506 can receive the activation request. The streaming proxy 506 can provide the request to the streaming server 502 for redirection with provided destination information at block 604. The streaming server 502 can disconnect the connection to the PC 504 at block 606 and start streaming the remote session to the receiving device 110 at block 608. The procedures can end at block 610.

To illustrate streaming sessions, a PC 504 can initially display a virtual or physical desktop session running from their work station. When the user comes to a conference room and wants to show their presentation which is on their virtual or physical remote desktop, the user can point their mobile device 106 to the conferencing device 110 with the installed exchange agent module 108. The exchange agent module 108 on the mobile device 106 can display a graphical representation of the conferencing device 110 in proximity as an identified device that can be shared. The user can direct the exchange agent module 108 on the mobile device 106 to initiate a sharing session. In turn, the user's virtual or physical remote desktop can start projecting on the conference device's screen. The user can then either use the conference device's keyboard to navigate the presentation or use their same mobile phone application to control the navigation.

In one embodiment, the multimedia session can be recorded on a server and or transcoded in real-time. This can allow other participants without the required clients to view the multimedia content in a read only mode. For example, the video can be broadcasted to an authenticated or anonymous web server. The video can then be rendered via an HTML5 video tag and displayed natively in any HTML5 browser without the need for plugins or the like.

The sending device 106 can provide additional input to the session in the form a remote pointer. When the receiving device 110 registers to a private branch exchange (PBX) as a phone device, such as a session initiation protocol (SIP) phone, the extension can be used to do a reverse look up for the device's address. In this case, the extension can be programmed in a user sending device's contact list. The mobile application on the sending device 106 then can be extended to allow a sharing action in addition to the normal list of actions such as dial, chat, etc. This sharing action can provide seamless sharing session activation.

Figure 7:
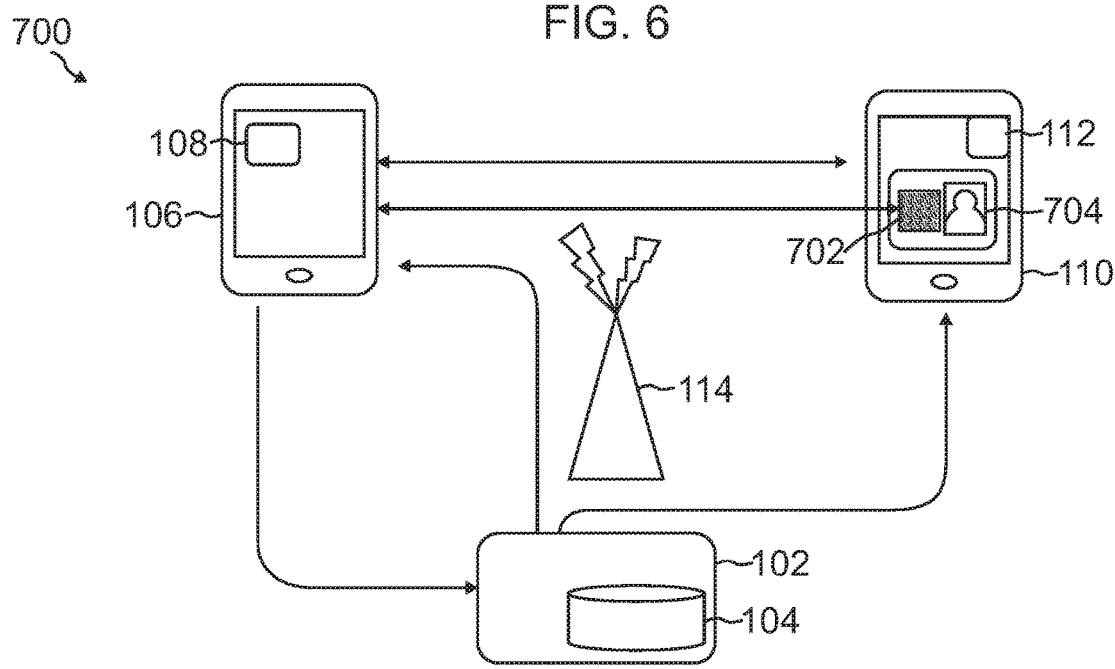
FIG. 7 is an exemplary system for providing a reverse lookup to establish a communication channel in accordance with one or more aspects of the present disclosure.

FIG. 7 is an exemplary system 700 for providing a reverse lookup to establish a communication channel in accordance with one or more aspects of the present disclosure. The system 700 can include an identity server module 104 operating on a server 102 that can be wirelessly connected to a plurality of communication devices 106 and 110 having exchange agent modules 108 and 112. Communications between them can be facilitated through a wireless interface 114 distributed within proximity of the devices 106 and 110. Fewer or more components can be represented within the system 100 and are not limited to those shown.

In one embodiment, reverse lookup can occur through a Quick Response (QR) code 702 that can be associated with the receiving device 110. The QR code 702 can be a matrix barcode readable by a dedicated reader provided on the sending device 106. The code 702 can consist of black modules arranged in a square pattern on a white background.

Other methods known to those skilled in the relevant art can be used to identify a user of the receiving device 110. For example, the receiver can be detected through facial recognition using a photo 704 provided on the device 110 or through a picture taken by the sending device 106.

FIG. 8 is a flow chart depicting illustrative procedures for setting up the communication channel using reverse lookup in accordance with one or more aspects of the present disclosure. The procedures can begin at block 800. At block 802, the sending device 106 can scan for receiving devices 110. In one embodiment, the sending device 106 can scan for the QR code 702 associated with the receiving device 110. Alternatively, or in combination therewith, the sender can take a picture of the user's face or use the photo 704 provided on the receiving device 110. In turn, a request can be built for the identity server module 104 that includes the receiving device's 110 tokens or other identification. The request can then be provided to the identity server module 104 at block 804.

The identity server module 104 can receive the request and perform a reverse lookup based on the token or identification in the request. In the case of a photo 704, the identity server module 104 operating on the server 102 would data mine a picture database using various facial recognition algorithms known to those skilled in the relevant art. When the identity server module 104 is unable to verify with a certain degree of precision who is within the photo 704, a list of top candidates can be sent back to the sending device 106 along with their thumbnails. The exchange agent module 108 can then provide a mechanism for the user to pick the correct candidate via a click, gestures etc. On failure to establish an identity for either client, the identity server module 104 can return a corresponding failure to the sending device 106 and the receiver is left untouched.

When a QR code 702 is used, the code 702 can be sent to the identity server module 104 to be evaluated after retrieved by the sending device 106. Alternatively, the exchange agent module 108 operating on the sending device 106 can be used to identify the receiving device 110. If the identity cannot be determined, a failure indicator is provided back to the sending device 106. A combination of techniques for reverse lookup can be used.

At decision block 806, the sending device 106 can determine whether the identity server module 104 has successfully identified the receiving device 110. This is generally provided by a successful indicator given by the identity server module 104. When the identity server module 104 cannot determine the user of the receiving device 110, the sending device 106 can provide a failure indicator to the sender at block 808. Upon successful identification, however, the identity server module 104 would know how to communicate with both devices 106 and 110 since their network addresses would be stored in its database. The identity server module 104 can act as a broker between both devices 106 and 110 in order to establish a communication channel at block 810.

If the channel is over WiFi®, it can forward initializations commands to each exchange agent module 108 and 112. These commands can include listening and allowing connections from the verified peer addresses. When the channel is over Bluetooth™, the identity server module 104 can automate the pairing such that user input is minimized. The commands sent from the server 102 to the devices 106 and 110 can involve, but are not limited to, enabling auto-discovery on the devices 106 and 110, obtaining information about perimeter devices from each exchange agent module 108 and 112, filtering out devices which are not part of the transaction, i.e. that are not the sending device 106 or the receiving device 110 and automatically pairing the devices 106 and 110. Both exchange agent modules 108 and 112 can now communicate over an established data channel. The procedures can end at block 812.

Returning to FIG. 1, the system 100 can contain at least three main modules, namely exchange agent modules 108 and 112 and the identity server module 104. The exchange agent module 108 on the mobile device 106 can be responsible for identifying devices in proximity and manage the sharing protocol. For purposes of illustration, the sending device 106 can be the user mobile device while the receiving device 110 can be a conferencing appliance which can act as a SIP conferencing end point to a switch.

The identity server module 104 can provide information to connected devices 106 and 110 such as a device name, number, IP address presence, contact information and potential location. As described above, the identity server module 104 can also provide mechanisms by which the devices 106 and 110 can establish a communication channel. The identity server module 104 can also provide a temporary tag which acts as an identifier for the device. The tag can contain an address or URI referencing the other device. It could also be used to derive the address or URI via a reverse lookup. When queries are received, the identity server module 104 knows the identification of both parties. The first identification can be obtained from the incoming query which contains the identification of the sending device 106 such as a token, IP/MAC address, etc. The second identification can be obtained from the message payload and can contain the identification for the second device 110. With both identifications known, the identity server module 104 can initiate background operations to link both devices 106 and 110 via a communication channel.

FIG. 7 also depicted a process to establish a WiFi® data channel between two mobile devices 106 and 110. The sending device 106 can scan the QR code 702 from the remote device 110 or takes a picture of the user's face and build a request for the identity server module 104. The identity server module 104 can receive the request and perform a reverse lookup based on the token or identification in the request.

On successful identification, the identity server module 104 can communicate with both devices 106 and 110 since their network addresses can be stored in its database. The identity server module 104 can act as a broker between both devices 106 and 110 in order to setup a communication channel. The receiving device 110, which can be a conferencing appliance, can be turned into an access point and the exchange agent module 108 on the sending device 106 can receive initialization commands. These commands can include listening and allowing connections from the verified peer address. After, both exchange agent modules 108 and 112 can communicate over an established data channel.

With a communication channel established, the systems described above can be extended. Telephony and data applications can be further integrated within a mobility session to provide enhanced values and a seamless experience to the end users using or interacting with multimedia appliances. For example, once a mobility session has been established between a device 106 and a conferencing appliance 110, contacts from the device 106 can be imported into the conference. While using their mobile device 106 to control the presentation on the conferencing appliance 110, a user can initiate a request to bring in their own contacts into the conference call facilitated by the appliance 110 without actually making a phone call from the device 106 to the imported contact or needing to know the conferencing appliance's phone number. The imported contact, on the other hand, can receive the call alert with a context of the conference. The context can include caller information, meeting participants, meeting topic/subject and the current discussion point such as a snap shot of the current presentation.

This is an extension to a system and method for seamless exchanging and interacting of multimedia content between mobile devices in a network. Operations on the guest's mobile/tablet device 106 can provide automation and seamless access application features that can be used to enhance productivity and interaction efficiency while containing data transfer cost. The systems can be altered for other applications between the mobile and tablet devices 106. Typically, a guest mobile user does not download an enterprise specific mobile application in order to use session mobility.

Allowing seamless enterprise WiFi® access to an unknown or untrusted mobile device 106 is not trivial. The conferencing appliance 110, in the case of an established session mobility, can be programmed to enable an access point from which guest mobile devices can have a temporary direct WiFi® access in a controlled method such that data security to an enterprise is not compromised.

In one embodiment, the extended system and method provides the ability to tie in telephony applications with session mobility by using the mobile device 106 as a remote control to bring contacts to a conference call leveraging a mobile phone's native interface and without the need to know the destination number such as the conferencing appliance 110. Participants being brought into the conference can be provided with a proper context of the current interaction/presentation. Context information can be shown visually or presented audibly.

The conferencing appliance 110 can be an access point from which guest mobile users can have WiFi® connectivity without the need of temporary access identifications or manual registration. This conferencing appliance 110 access point can proxy temporary data traffic between the mobile device 106 and the identity server module 104 thus containing the risk of unwanted data access to the rest of the enterprise. WiFi® access enablement for the guest mobile device 106 can also be accomplished automatically as part of session mobility interaction. Once session mobility is established, the guest user can initiate a request to transfer data file from the mobile/tablet device 106 or from the cloud onto the virtual desktop session of the conferencing appliance 110 leveraging either WiFi® connectivity or a backend server connection to the cloud, thus incurring no mobile data cost.

When carrier traffic is not an issue and WiFi® is not required, the sending exchange agent module 108 can continue to use the carrier network to communicate to the identity server module 104 since it resides on the network edge. When that user enters the enterprise, they are able to use functions of the system. This can alleviate many of the security concerns with regards to untrusted/unknown clients on private networks. Since the identity server module 104 can act like a broker/proxy, remote sending clients can be unaware that receiving clients reside on the private network. This can provide a mechanism to access private networks in a secure fashion while remaining simple and intuitive to the user, for example, uploading a file to a view instance. When using thin clients, this can also provide a way to access a private network without the need to install native thick clients, for example, scanning the barcode on the device, entering the URL or indirectly accessing the network from the browser.

FIG. 9 is a sequence diagram depicting illustrative procedures for seamlessly enabling WiFi® communications between a stationary multimedia phone device 110 and a mobile phone 106 in accordance with one or more aspects of the present disclosure. It is not trivial to allow seamless enterprise WiFi® access to an unknown/untrusted mobile device 106. However, the conferencing appliance 110, in the case of an established session mobility, can be programmed to enable an access point from which guest mobile devices 106 can have a temporary direct WiFi® access in a controlled method such that data security to an enterprise is not compromised.

After a communication channel is established, the processes for providing a WiFi® connection can begin when the sender exchange agent module 108 enables WiFi® access at process 902. The guest device 106 having the exchange agent module 108 can automatically make a request to the identity server module 104, after the establishment of a mobility session, to switch from 3/4G connectivity to WiFi® access seamlessly. Other carrier services can be used to enable the WiFi® access.

At process 904, the identity server module 104 can forward the request to the receiving exchange agent module 112 on the conferencing appliance 110. The request can be proxied to the receiver exchange agent module 112. The receiving exchange agent module 112 can enable a WiFi® mechanism for connecting with devices 106 at process 906. The exchange agent module 112 can generate a random service set identifier (SSID).

Continuing with FIG. 9, at process 908, the receiver exchange agent module 112 can report the status of the WiFi® connection to the identity server module 104. If the module 112 failed to establish a WiFi® connection, the module 112 can indicate to the sender exchange agent module 108 to continue to use its 3/4G connection. Otherwise, the exchange agent module 112 can report the successful connection by sending the randomly generated SSID and connection parameters to the identity server module 104. Typically, the connection parameters can include an encryption algorithm for securing the communications between the sending device 106 and the conferencing appliance 110.

The SSID can be sent to the exchange agent module 108 of the sending device 106 by the identity server module 104 at process 910 along with the success indicator. A WiFi® reachable address for the identity server module 104 can be provided to the sending exchange agent module 108 with the connection parameters including encryption algorithms. The exchange agent module 108 on the sending device 106, at process 912, can enable the WiFi® connection through the given connection parameters and the SSID. The 3/4G connection can be dropped in favor of a new re-established WiFi® connection with the identity server module 104 via the new address. This can remove costs associated with the 3/4G connection. For security purposes, the signal strength from the conferencing appliance 110 having the receiver exchange agent module 112 can be controlled and fine tuned to an appropriate power level range which can confine the WiFi® access zone.

As an extension to the systems and methods described above, the mobile phone 106 can turn into a touchpad device that can also be used as a white boarding tool to project hand drawings to the conference participants without the need of additional software tools. Remote users can also view the whiteboard and interact with it. The exchange agent module 108 can turn the screen on the sending device 106 to a touch pad for controlling the navigation of the content on the receiving device 110. This touch pad can also act as a whiteboard where hand drawings can be rendered into recognizable images and projected, by a push of a button, to the receiving device 110 via a web interface without the need of launching other external whiteboard applications. Exchange agent modules 108 on multiple devices 106 can be native, thin or a combination of both.

Turning to FIG. 10, a sequence diagram depicting illustrative procedures for sharing information from a mobile device 106 to participants in a conference call in accordance with one or more aspects of the present disclosure is provided. The sender exchange agent module 108 can turn the screen of the sending device 106 to a touch pad for controlling the navigation of the content on the receiving device 110. In one embodiment, the device 106 is not given full control of the content. Instead, the content can be managed by an administrator, for example, a party that can but does not necessarily have to be near the conferencing appliance 110.

White boarding activities can begin at process 1002 where a request to start activity can be provided to the identity server module 104 from the sender exchange agent module 108. The identity server module 104 can broadcast the request to exchange agent modules on connected devices 106 as well as that of the conferencing appliance 110 at process 1004. The exchange agent module 112 on the conferencing appliance 110 can determine whether to connect with the device 106 sending the request.

When the conferencing appliance 110 does not or cannot accept the request, a message can be provided to the device 106 through the identity server module 104 indicating reasons why its request was denied. For example, the appliance 110 can indicate that too many users are connected with the appliance 110. The appliance 110 can also indicate that the user of the device 106 does not have proper permissions or settings to whiteboard with the collaboration appliance 110. If successful, however, the collaboration appliance 110 can report the success by providing a message to the identity server module 104 at process 1006. The identity server module 104 can then forward the successful indicator through proxy to the sender exchange agent module 108 at process 1008.

At process 1010, the touch pad on the sending device 106 can allow hand drawings that can be rendered into recognizable images and projected, by a push of a button, to the receiving device 110 via a web interface without the need of launching other external whiteboard applications. The sender exchange agent module 108 can be native, thin or a combination of both. When sending over constructs, traffic can be minimized by not sending every point detected in a gesture or motion event. For example, instead of sending a series of points for a drawn circle, the type of circle can be sent along with its center coordinates and radius. This can yield clear visuals while providing a mechanism to export this data into an offline document for further manipulation, instead of a simple PNG/PDF, etc.

At process 1012, the exchange agent module 108 on the sending device 106 can send the hand drawings or recognized constructs to the identity service module 104. The identity service module 104 can then provide those interactions on the whiteboard to peers of the device 106, for example, other connected devices 106 to the conferencing appliance 110. As shown in FIG. 10, changes can be sent to the conferencing appliance 110 where it can then be distributed to other connected devices 106. The identity server module 104 can provide the hand drawings or constructs to the receiver exchange agent module 112 at process 1014.

At the conferencing appliance 110, the exchange agent module 112 can display in real-time received constructs or hand motions on the whiteboard of its display at process 1016. The exchange agent module 108 on the sending device 106 can be enhanced to allow interaction with the native mobile applications in order to allow file synchronization when the user wants to project a file/presentation from their device to the receiving device 110 or when they wish to add a contact to the conference.

Beforehand, interactions on the whiteboard of the sending device 106 were sent to the conference appliance 112 through the identity service module 104. The interactions were then displayed on the whiteboard of the conferencing appliance 112. A number of different variations can exist. For example, those interactions received from the sender device 106 can be propagated to other devices. Those devices can be connected to the conferencing appliance 112 wirelessly through the identity service module 104 or through a network interface. The network interface, in turn, can be connected to outside devices not directly linked with the conferencing appliance 110, but through an outside network.

In one embodiment, interactions can be provided directly on the whiteboard of the conferencing appliance 112. These interactions can then be distributed to devices 106 that also have whiteboards through the identity service module 104. In addition, the interactions can be provided to outside devices, as described above. The motions or gestures can be captured to form constructs. The constructs can then be provided to those devices.

To facilitate the distribution of these interactions between the connected devices, the identity service module 104 can continuously update the devices. In one embodiment, the exchange agent modules 108 and 112 on the devices 106 and 110 can indicate whether an update to their whiteboard is available. The user can simply disregard any changes that they have made to their whiteboard in lieu of an update. Indicators showing which party making the update to the whiteboard can be provided to the devices. In one embodiment, changes can also be visible in real-time. Users do not have to commit their changes in order for them to appear on another user's whiteboard. A complete history of whiteboard activities in sequential and time-stamped order can be stored on the identity server module 104 to provide change history functionality with synchronized voice playback (if voice recording is enabled). This can provide rewind/fast forward functionalities and turn whiteboard sessions into instant webcasts for internal use.

The mobile device 106 can be used as a remote control to bring personal contacts to a conference. When the initial connection has been established between the device 106 and the conferencing appliance 110, other contacts can be added. After the mobile user starts dialing their contact, the exchange agent module 108 on the sender device 106 can be used to intercept the dialing process and collect the contact information for that number. The contact number can be provided to the receiver exchange agent module 112 on the conferencing appliance 110 where the contact can be added into the conference. More than one contact can be added at a time.

In one embodiment, a list of contacts can be provided on a native contact application on the device 106 instead of a call being made to the contact. After selecting a contact from their native contact application, the user can have the option to add the chosen contact directly to the conference, since the exchange agent module 108 can extend the native contact application. The user can choose a contact from an aggregate list displayed in the user interface of the exchange agent module 108. This aggregate list can be a combination of local mobile device contacts in addition to cloud based contacts and enterprise contacts.

This information can then be proxied to the receiving device 110 via the identity server module 104. The conferencing appliance 110 can then request a proxy dialing via consultation call. The exchange agent module 112 on the receiving device 110 can have the necessary information about the current call, the participants, the context, etc. that can be passed to the newly invited contact via data channel or TTS audio.

The technology described herein can be implemented as logical operations and/or modules. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada, or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

In software implementations, computer software and/or data is stored on a machine readable medium as part of a computer program product, and is loaded into a computer system or other device or machine via a removable storage drive, hard drive, or communications interface. Computer programs, also called computer control logic or computer readable program code, are stored in a main and/or secondary memory, and executed by one or more processors, controllers, or the like to cause the one or more processors to perform the functions of the disclosure as described herein.

The figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present disclosure, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method of bringing at least one contact into a conference through an identity module, the method comprising:
    registering a receiving device with an identity module;
    using the identity module, assigning a unique identifier to said receiving device;
    providing said unique identifier to said receiving device;
    discovering said receiving device by the sending device;
    receiving said unique identifier of said receiving device at said sending device;
    validating the receiving device with information on the identity module;
    providing connection requirements to said sending device by said identity module;
    using said identity module, initiating a background operation to link said receiving device and said sending device via a communication channel for sharing exchanged content between said receiving device and said sending device;
    using said sending device, establishing a sharing connection with the receiving device;
    collecting information from the sending device for at least one contact; and
    providing the information for the at least one contact to the receiving device through the identity module to add the at least one contact to the conference using the receiving device.

2. The method of claim 1, further comprising intercepting a dialing process on the sending device to the at least one contact; and determining whether to add the at least one contact into the conference by a user of the sending device.

3. The method of claim 1, further comprising displaying a plurality of contacts to add into the conference on the sending device and receiving a user selection for the at least one contact.

4. The method of claim 3, wherein displaying the plurality of contacts comprises presenting at least one of local contacts, cloud based contacts, enterprise contacts and combination thereof.

5. The method of claim 1, wherein adding the at least one contact to the conference comprises proxy dialing the at least one contact with the information.

6. The method of claim 5, comprising providing a context of the conference to the at least one contact.

7. The method of claim 6, wherein the context comprises one or more of caller identification, meeting participants, meeting topic, and current discussion point.

8. The method of claim 1, wherein the at least one contact is automatically added to the conference after being authorized by a user of the sending device.

9. The method of claim 1, comprising synchronizing at least one file with the device.

* * * * *